J. A. KNIGHT.
ELECTRICAL MEASURING INSTRUMENT.
APPLICATION FILED JUNE 6, 1916.

1,299,736.

Patented Apr. 8, 1919.
2 SHEETS—SHEET 1.

WITNESSES:
Fred A. Lind
J H Procter

INVENTOR
John A. Knight
BY
Wesley G Carr
ATTORNEY

J. A. KNIGHT.
ELECTRICAL MEASURING INSTRUMENT.
APPLICATION FILED JUNE 6, 1916.

1,299,736.

Patented Apr. 8, 1919.
2 SHEETS—SHEET 2.

WITNESSES:
Fred A. Lind
J. H. Procter

INVENTOR
John A. Knight
BY
Wesley G. Carr
ATTORNEY

UNITED STATES PATENT OFFICE.

JOHN A. KNIGHT, OF HAMILTON, ONTARIO, CANADA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,299,736.

Specification of Letters Patent. Patented Apr. 8, 1919.

Application filed June 6, 1916. Serial No. 101,932.

*To all whom it may concern:*

Be it known that I, JOHN A. KNIGHT, a subject of the King of Great Britain, and a resident of Hamilton, in the Province of Ontario, in the Dominion of Canada, have invented a new and useful Improvement in Electrical Measuring Instruments, of which the following is a specification.

My invention relates to electrical measuring instruments such as wattmeters and similar motor-meters for use in connection with alternating-current circuits, and it has for its objects to provide a wattmeter having an exceptionally high degree of accuracy in operation over a wide range of load and having adjusting devices that are exceedingly small and compact in construction and efficient in operation.

Figure 1:
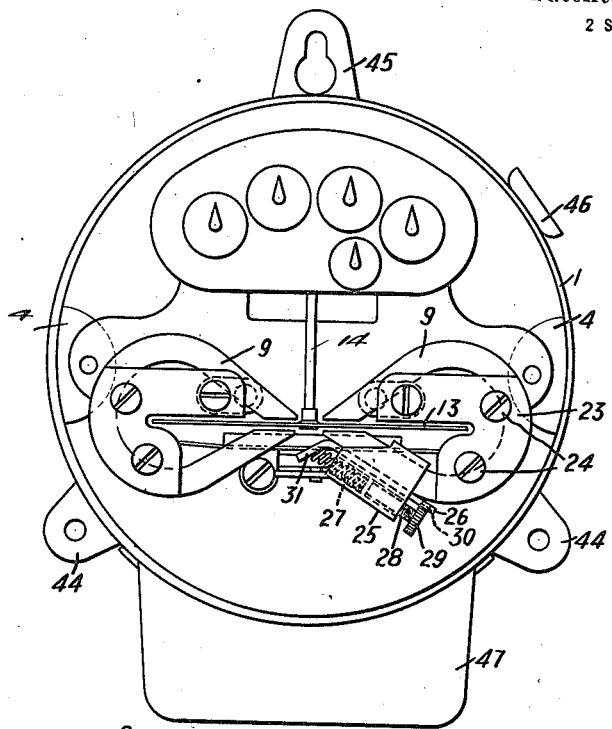
Figure 2:
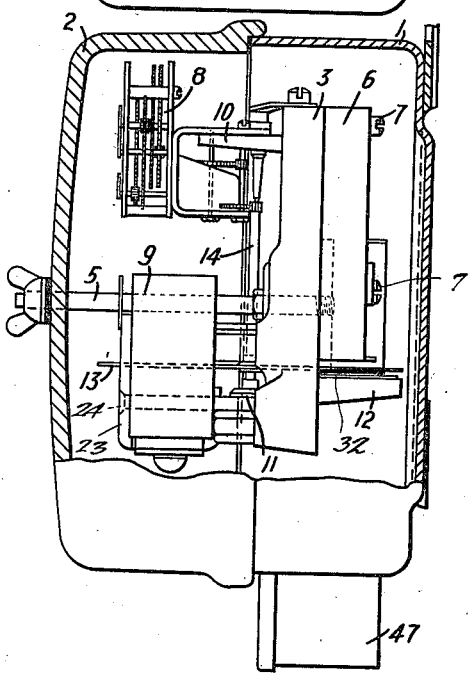
Figure 3:
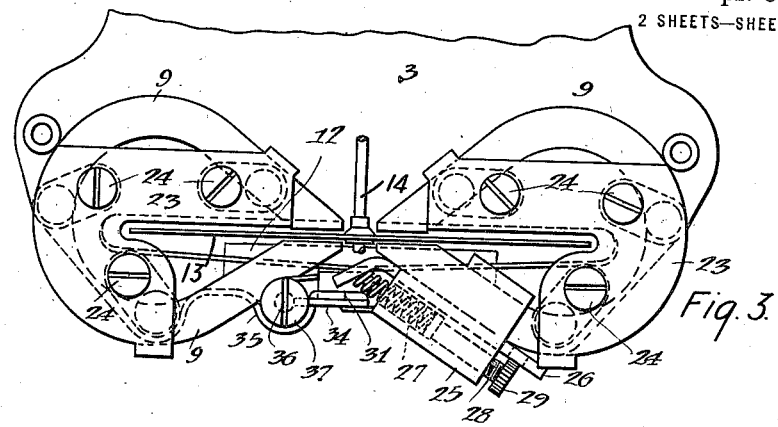
Figure 4:
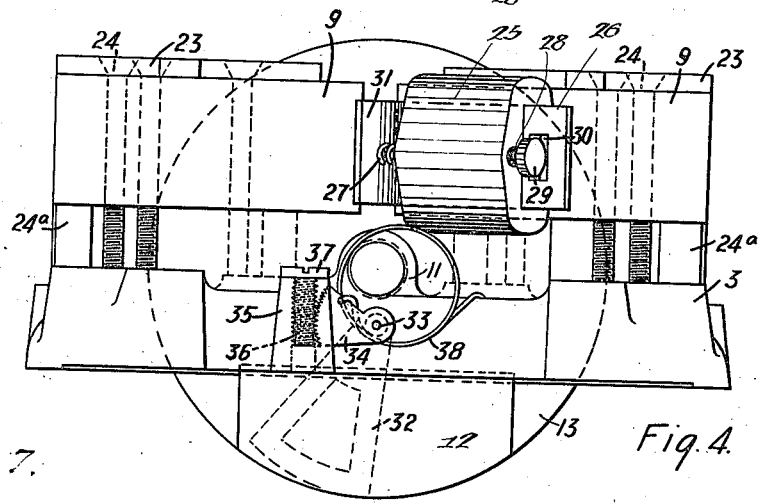
Figures 5, 6, 7:
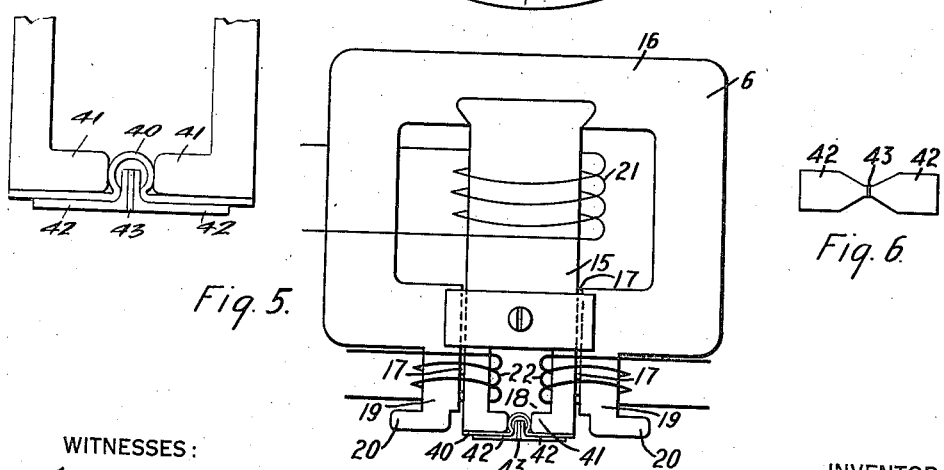

In the accompanying drawings, Figure 1 is a front elevational view of a wattmeter embodying my invention; Fig. 2 is a side elevational view, with parts broken away, of the meter shown in Fig. 1; Fig. 3 is a detail view of the full-load adjusting device embodied in the meter shown in Figs. 1 and 2; Fig. 4 is a bottom plan view of the instrument shown in Figs. 1 and 2, illustrating the light and full-load adjustments embodying my invention; Fig. 5 is a detail view of the magnetizable core member embodying my invention; Fig. 6 is a view of a saturatable member embodying one part of my invention, and Fig. 7 is a detail view of a portion of the structure shown in Fig. 5.

The operating parts of the meter are mounted within a pressed steel box or case 1 for which a removable cover 2 is provided, the said operating parts comprising a supporting member 3 secured to bosses or seats 4, that are welded or otherwise secured to the inner sides of the box or case 1, by means of bolts 5 which also serve to secure the cover 2 in position. The magnetizable core member 6 of the meter is secured to one side of the supporting member 3 by screws 7. The supporting member 3 is provided with brackets 10 and 11 on one side and a bracket 12 on its other side. An integrating mechanism 8 is mounted on the bracket 10, and damping magnets 9 are spaced from the front face of the supporting member 3 by spacing posts 24ª and secured thereto by means of clamping plates 23 and positioning screws 24. An armature 13 is mounted on a shaft 14 that is adapted to be supported between the brackets 10 and 11 on the supporting member 3.

The main portion of the electromagnet 6 has substantially the form of a hollow rectangle having an opening in one of its sides. A central member or leg 15 is adapted to be mitered, at one of its ends, into one of the cross-pieces 16 of the electromagnet 6 and to extend through, and to be separated from, the sides of the opening in the core member by air gaps 17. Each of the legs of the electromagnet is extended, at the side thereof that is provided with air gaps, to form polar projections 19 which are disposed adjacent to the armature 13. The bracket 12 on the supporting member 3 is provided with a plain surface that lies directly opposite the poles of the electromagnet, the armature 13 being interposed between the said surface and the electromagnet.

The central leg 15 of the electromagnet 6 is provided with a partially inclosed slot 18 near its polar extremity, the outer end of the slot being preferably only of sufficient width to permit of the insertion of the windings or coils to be hereinafter described. The outer legs or polar projections 19 of the magnetizable core member 6 are provided with lateral extensions 20 that constitute pole shoes which serve to enlarge the polar area of the magnet. The central leg 15 of the electromagnet is provided with a potential winding 21 that is adapted to be connected in shunt relation to an electric circuit in connection with which the instrument is employed. The polar projections 19 of the electromagnet are provided with two series of load windings 22 that occupy the slot 18 in the end of the central leg and the spaces behind the pole shoes 20. Thus, the windings 22 respectively surround parts of the middle leg and the outer leg and also span the air gaps between them and are connected in series with one of the conductors of the circuit to which the instrument is connected.

The movements of the armature 13 are retarded by means of the permanent magnets 9 the polar extremities of which are disposed adjacent to the armature and are so shaped that the magnetic lines of flux therefrom do not cross the grain of the magnets. The magnets are adapted to be maintained permanently in position after being adjusted. A guiding member 25 is secured to one of the permanent magnets 9 and is adapted to support a slidable magnetizable member 26. A spring 27 is disposed in an opening in one end of the guiding member 25, and a screw 28, having a head 29 thereon that is adapted to extend into a slit 30 in the slidable member 26, is also disposed in the guiding member 25. Thus, by turning the screw 28, one end 31 of the slidable member 26 may be adapted to more or less bridge the space between the poles of the permanent magnets 9. In this manner, the flux in the permanent magnets 9 may be more or less shunted from the armature 13 for the purpose of controlling its speed at full load. The spring 27 is adapted to so act against the member 26 that it is normally restrained in any position until the screw 28 is turned.

A substantially flat closed-circuit conductor 32 is mounted on a pivot pin 33 and is adapted to be disposed between the bracket 12 and the armature 13. The conductor 32 is provided with a worm wheel segment 34 the teeth of which project through an opening in a projection 35 on the supporting member 3. A screw 36, having a head 37, is disposed in the projection 35 and is adapted to engage the teeth of the gear segment 34 for the purpose of moving the conductor 32 to predetermined positions. Thus, when the screw 36 is turned, the conductor 32 will be moved across the face of the poles of the electromagnet for the purpose of so varying the torque of the armature 13 as to compensate for friction at light loads. A spring 38 is adapted to so act upon the gear segment 34 as to prevent accidental displacement of the screw 36.

A non-magnetizable spring clamp 40 is disposed across the face of the central leg 15 of the magnetizable member 6 and is so bent between the projections 41 that partially close the slot 18 as to retain it in position. Two magnetizable members 42 are disposed adjacent the member 40 and are separated by a non-magnetizable wedge 43. The magnetizable members 42, adjacent the wedge 43, are of such cross-sectional area that they become saturated under predetermined conditions. The portion of the member 40 that is bent between the projections 41 is of such shape that it is adapted to clamp the members 42 and 43 in position.

It is a well known fact that the damping of the armature of a motor-meter is relatively great at its higher loads and it has been found necessary to provide some means for increasing its torque at these high loads in greater proportion than the increase in load. In order to take care of this, I provide the magnetizable members 42 having such dimensions that, at predetermined values of current traversing the windings 22, they become saturated to cause disproportionately more flux to cut the armature. That is, some of the flux induced by the windings 22 traverses the projections 41, the non-magnetizable member 40, the magnetizable members 42 and the wedge 43, and some of it cuts the armature, and when the members 42 become saturated, the magneto-motive force drop between the members 42 becomes a relatively large part of the magneto-motive force drop between the projections 41, which magneto-motive force drop is proportional to the current that traverses the winding 22. Thus, for high values of current in the winding 22, the flux that cuts the armature is greater in proportion to the current than for low values of current. This will have the effect of speeding up the armature to compensate for its greater retardation at high loads.

The central core member 15 is adapted to be removable with respect to the core member 6 in order that the winding 21 may be more easily disposed thereon, thus facilitating and cheapening the cost of assembling and constructing.

The box or case 1 is preferably constructed of pressed material and is provided with two feet 44 and with a lug or hanger member 45 that are welded to its under side. A sealing cup 46 is welded to one side of the case 1 for the purpose of receiving a seal, and a terminal casing 47 is welded to the lower side of the case 1 for the purpose of receiving a terminal block (not shown).

While the present device is particularly adapted to the measurement of energy, it is primarily a motor, and I, accordingly, intend that the appended claims shall be construed to include all motors coming within their terms, irrespective of the purpose for which they are employed.

Although the specific form of construction shown has been found highly effective, it is obvious that many modifications may be made within the spirit of the invention, and I desire to include all such modifications within the scope of the claims.

I claim as my invention:

1. An electromagnet for an electrical measuring instrument comprising a main magnetizable member of substantially the form of a hollow rectangle having an opening in one of its sides and having outwardly extending polar projections at the sides of said opening, and a magnetizable member removably mitered into the closed side of the main member and projecting through the opposite side opening.

2. An electromagnet for an electrical measuring instrument comprising a main magnetizable member of substantially the form of a hollow rectangle having an opening in one of its sides and having outwardly extending polar projections at the sides of said opening, and a megnetizable member removably mitered into the closed side of the main member and projecting through the opening in the opposite side of said main member, the outer end of said removable member having a pair of spaced polar projections.

3. A motor-meter having a magnetizable core comprising a central member and side members having polar projections that are separated by air gaps, and saturatable members disposed between and upon the ends of the polar projections of the central member.

4. A moter-meter having a magnetizable core comprising a central member and side members having polar projections that are separated by air gaps, the ends of the polar projections of the central member projecting toward each other into close proximity, a non-magnetizable spring clamp disposed upon the outer ends of the polar projections of the central member and having a loop disposed between said projections, and saturatable members disposed upon said spring clamp and having projections that are embraced by the loop of the spring clamp, whereby said members are held in place.

5. A motor-meter comprising an armature, a magnetizable core having a central member and side members that are provided with polar projections, the free ends of the polar projections of the central member being in close proximity to each other, a potential winding surrounding the central member, two series windings each of which surrounds a central-member polar projection and a side-member polar projection, and a magnetizable member disposed upon the face of the central member and adapted to become saturated under predetermined current conditions.

6. A motor-meter comprising an armature, a magnetizable core having polar projections that are separated by small air gaps and are disposed adjacent to one side only of the armature, a potential winding upon the core, a series winding surrounding the separated portions of the polar projections, and means disposed upon the face of one of the polar projections for causing the flux to cut the armature disproportionately to the current traversing the current winding, under predetermined current conditions.

7. A motor-meter comprising an armature, a magnetizable core having polar projections that are separated by small air gaps and are disposed adjacent to one side only of the armature, a potential winding upon the core, a series winding surrounding the separated portions of the polar projections, and a saturatable member disposed upon the end of one of the polar projections for causing the flux to cut the armature disproportionately to the current traversing the current winding, under predetermined current conditions.

8. A motor-meter comprising a magnetizable core having a central member and side members that are separated by air gaps, the central member being provided with a slot that is partially closed by projections on its sides, a non-magnetizable member disposed across the outer end of the central member and extending between the projections to hold it in place, and magnetizable means disposed adjacent the non-magnetizable member for partially bridging the gap between the projections and adapted to become saturated under predetermined conditions of the current applied to the motor meter.

9. A motor-meter comprising a magnetizable core having a central member and side members that are separated by air gaps, the central member being provided with a slot that is partially closed by projections on its sides, a non-magnetizable member disposed across the outer end of the central member and extending between the projections to hold it in place, and saturatable members disposed adjacent the non-magnetizable member for partially bridging the gap between the projections.

10. A motor-meter comprising a magnetizable core having a central member and side members that are separated by air gaps, the central member being provided with a partially inclosed slot at its outer end, a non-magnetizable member disposed over the outer end of the central member, two magnetizable members disposed adjacent the non-magnetizable member for partially closing the slot in the end of the central member and a non-magnetizable member disposed between the magnetizable members.

11. A motor-meter comprising a magnetizable core having a central member and side members that are separated by air gaps, the central member being provided with a partially inclosed slot at its outer end, and a magnetizable member disposed over the end of the central member and the slot therein.

12. A light-load adjusting device for a motor-meter comprising a pivotally mounted closed-circuit conductor, a worm-gear segment operatively connected thereto, a worm screw for actuating the worm-gear segment and a spring for accentuating the engagement between the worm-gear segment and the worm screw.

13. A light-load adjusting device for a motor-meter comprising a pivotally mounted closed-circuit conductor, a worm-gear segment operatively connected thereto and a worm screw for actuating the worm-gear segment.

14. A light-load adjusting device for a motor-meter comprising a pivotally mounted closed-circuit conductor, a worm-gear segment operatively connected thereto, a worm screw for actuating the worm-gear segment and means for causing the worm-gear segment to frictionally engage the worm screw.

15. In a motor-meter, the combination with a rotatable armature and a pair of permanent damping magnets therefor, of a magnetizable member, a holder secured to one of the magnets in which said member is slidably mounted, an adjusting screw for said member and a spring interposed between said member and said screw.

16. In a motor-meter, the combination with a rotatable armature and a pair of damping magnets therefor, of a flux-diverting bar adjustably supported by one of said magnets and having a laterally bent end disposed adjacent to opposing poles of said magnets at one side of the armature, and a screw for adjusting said flux-diverting member to vary the amount of flux diverted by its laterally-bent end.

17. In a motor-meter, the combination with a rotatable armature and damping magnets therefor, of a slidable magnetizable member adapted to assume various positions adjacent the poles of the damping magnets, a holder for the slidable member, and a screw the head of which is adapted to engage the slidable member for adjusting its position with respect to the magnet poles.

18. In a motor-meter, the combination with a rotatable armature and damping magnets therefor, of a slidable magnetizable member having a slot and adapted to assume various positions adjacent the poles of the damping magnets, a holder for the slidable member that is mounted on one of the damping magnets, and a screw disposed in the holder the head of which engages the slot in the slidable member for adjusting the position of said member with respect to the magnet poles.

In testimony whereof, I have hereunto subscribed my name this 29th day of May, 1916.

JOHN A. KNIGHT.